UNITED STATES PATENT OFFICE.

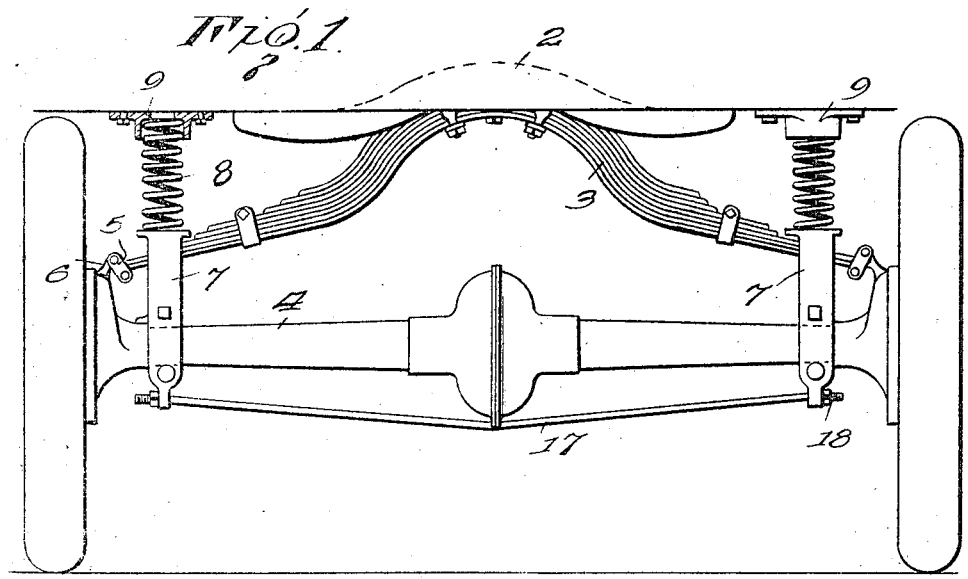
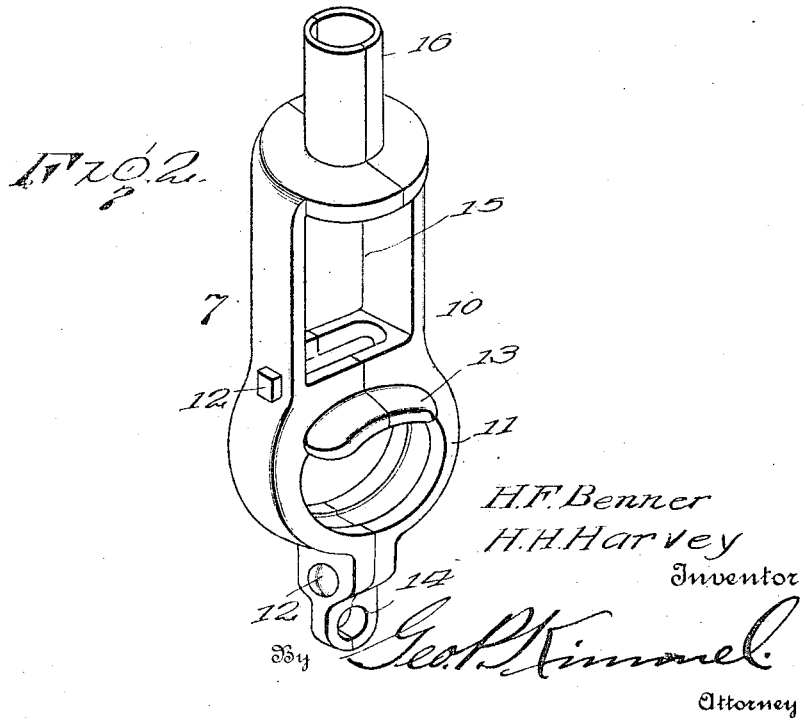

HARVEY F. BENNER AND HENRY H. HARVEY, OF KENTON, OHIO.

SUPPLEMENTARY SPRING FOR VEHICLES.

1,260,131.        Specification of Letters Patent.      Patented Mar. 19, 1918.

Application filed July 13, 1917. Serial No. 180,396.

*To all whom it may concern:*

Be it known that we, HARVEY F. BENNER and HENRY H. HARVEY, citizens of the United States, and residents of Kenton, in the county of Hardin and State of Ohio, have invented certain new and useful Improvements in Supplementary Springs for Vehicles, of which the following is a specification.

This invention relates to new and useful improvements in auxiliary springs for vehicles, and the same is especially designed as a reinforcing support for the main body supporting spring of a vehicle, the device being especially applicable to a certain well known type of vehicle already in use, said device however being readily applicable to various other types of vehicles and requiring no material change in applying the same thereto.

Another object of the invention is to form a support for the vehicle spring so as to materially increase the carrying capacity of a vehicle and preventing the frame of the vehicle from extending downwardly and shearing off the center bolt and also shifting laterally. The application of this device will prevent the loaded body of the vehicle from swaying, and maintain the same in a substantially upright position, also avoiding the tipping of the front end of the body. This auxiliary supporting device will double the carrying capacity of a vehicle, and incidentally will relieve undue strain on the tires when the vehicle is heavily loaded and is traveling over rough roads. The application of this device enables the chassis of a passenger car to be used as a truck, as the same will support loads much greater than the springs originally were intended for.

A further object of the invention is to provide a device of this character which is easily and simply constructed, inexpensive to manufacture, and one which will be very efficient in operation.

With these and numerous other objects in view, our invention consists of the novel features of construction, combination and arrangement of parts which will be herein referred to and more particularly pointed out in the specification and claims.

In the accompanying drawings:

Figure 1 is a rear elevation of a portion of a vehicle showing the application of the present invention thereto; and Fig. 2 is a perspective view of the upright supporting member, that is secured to the axle of the vehicle.

In describing our invention we shall refer to the drawings in which similar reference characters designate corresponding parts throughout the several views.

The numeral 1 designates the vehicle body, to which is secured the usual type of bolster 2, that supports the main body supporting spring 3, which is shown as of the multiple leaf type as centrally arched, the extremities of said spring being secured to the axle housing 4, by the usual type of swinging shackles 5, that are connected with arms 6 projecting from said housing. All of the parts above described are of the conventional construction and arrangement.

In carrying out the object of the present invention, we employ a pair of auxiliary body supporting units designated as an entirety by the numeral 7, and as each of these units are similar, we will only specifically describe one of the same. Each body supporting unit comprises a coiled expansion spring 8, which has its upper end positioned within a socket member 9, secured to the body 1, at a point directly above the main spring 3 adjacent the end of the same.

To support the lower end of the coil expansion spring 8, is provided an upright supporting member 10, that is split longitudinally, forming two sections, and said member has its lower end adapted to clampingly engage the axle housing 4. The lower end of the member 10 is enlarged as shown at 11 to form clamping jaws, and said parts of the member are held in assembled position by fastening bolts 12 that extend therethrough above and below the enlarged portion 11. A projecting lip 13 is formed on the member that engages the axle housing to prevent undue lateral movement, or outward swinging motion of said upright member when the same is in position. This projecting lip 13 acts as a reënforcement to additionally support the member upright. The extremity of the lower end of the member 10 is formed with a loop portion 14, for a purpose to be hereinafter more fully described.

The upper portion of the upright supporting member 10 is bifurcated as shown at 15, and owing to the fact that the said member is disposed directly beneath the main spring 3, the end of said spring will be positioned through said slotted portion. The end of the main spring is normally disposed at the top of the slotted portion so as to allow room for the spring to move down through the same, and not retard the ordinary movement of said spring when in operation. The upper end of the member 10 has a projecting stud 16 formed thereon, adapted to be surrounded by the lower end of the coiled expansion spring 8. The lower end of the spring will rest on the top of this upright supporting member, said member being normally held in rigid position, and immovably.

To additionally secure the upright members 10 when the same are in operative position, we have provided a truss rod 17 that extends beneath the axle housing 4 and has its opposite ends positioned through the loops 14 on the lower ends of said members, said ends of the rod being held in position by locking nuts 18, as clearly shown in Fig. 1 of the drawings.

In operation when the body supporting units 7 are in position as clearly shown in Fig. 1 of the drawings, the same will not interfere in any manner with the ordinary operation of the main spring 3 that supports the body of the vehicle above the axle housing 4. Owing to the fact that the lower ends of the coiled auxiliary expansion springs 8 are rigidly supported in position above the main spring, all the load is therefore not disposed on the center of the spring 3, but a substantial portion of said load is carried by the auxiliary units. As these units are positioned adjacent the ends of the axle housing, and on opposite sides of the vehicle body, they will prevent lateral pulling of the body, thereby overcoming the tendency of the heavily loaded machine to sway laterally, especially in making short turns and traveling over rough roads. The truss rod 17, and the projecting lips 13 will tend to securely hold the supporting members 10 in an upright position and rigidly connected with the opposite ends of the axle housing. Owing to the fact that the upright members 10 are split longitudinally and formed in two sections, it is obvious that the same are easily and quickly applicable to the housing with very little trouble. The whole device may be applied to any type of motor vehicle although the same is especially applicable to a certain well known type of machine.

From the above description taken in connection with the accompanying drawings, it is thought that a clear and comprehensive understanding of the construction, operation, and advantages of our invention may be had, and while we have shown and described the device as embodying a specific structure, we desire that it be understood that such changes may be made in said structure as do not depart from the spirit and scope of the invention as claimed.

Having fully described our invention, what we claim as new, and desire to secure by Letters Patent is:

1. The combination with a vehicle body, an axle, and a transverse bowed spring interposed therebetween, of auxiliary supporting units interposed between the vehicle and axle including socket members on the vehicle body above the main spring, coiled springs having their upper ends positioned in said sockets, upright members secured to the axle and engaging the lower end of said coiled springs, said members being slotted to receive the ends of the main spring, and a truss rod connecting said members beneath the axle.

2. An auxiliary supporting unit including a socket member adapted to be secured to a vehicle body, an upright support formed in two sections adapted to clampingly engage an axle at its lower end, the upper portion of said member being bifurcated, a projecting stud on the upper end thereof disposed in alinement with the socket member, and a coiled spring having one end positioned in the socket member and the other surrounding the stud on the upper end of the supporting member.

In testimony whereof we affix our signatures hereto.

HARVEY F. BENNER.
HENRY H. HARVEY.